_United States Patent Office_

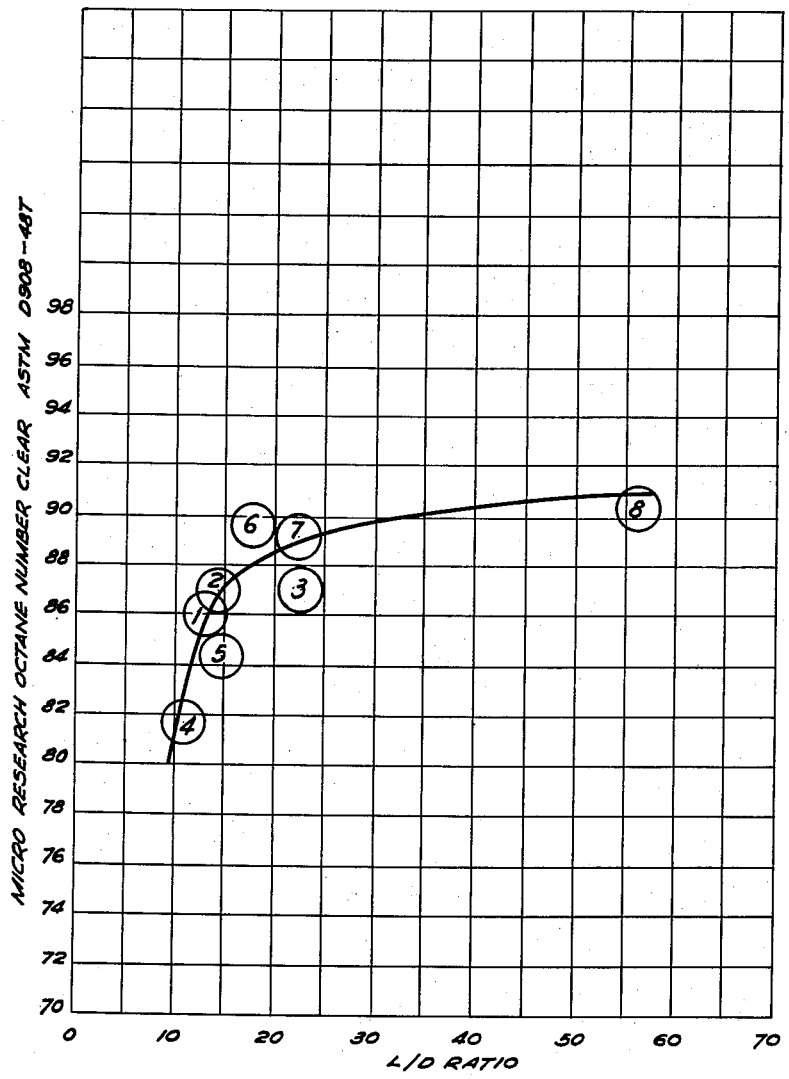

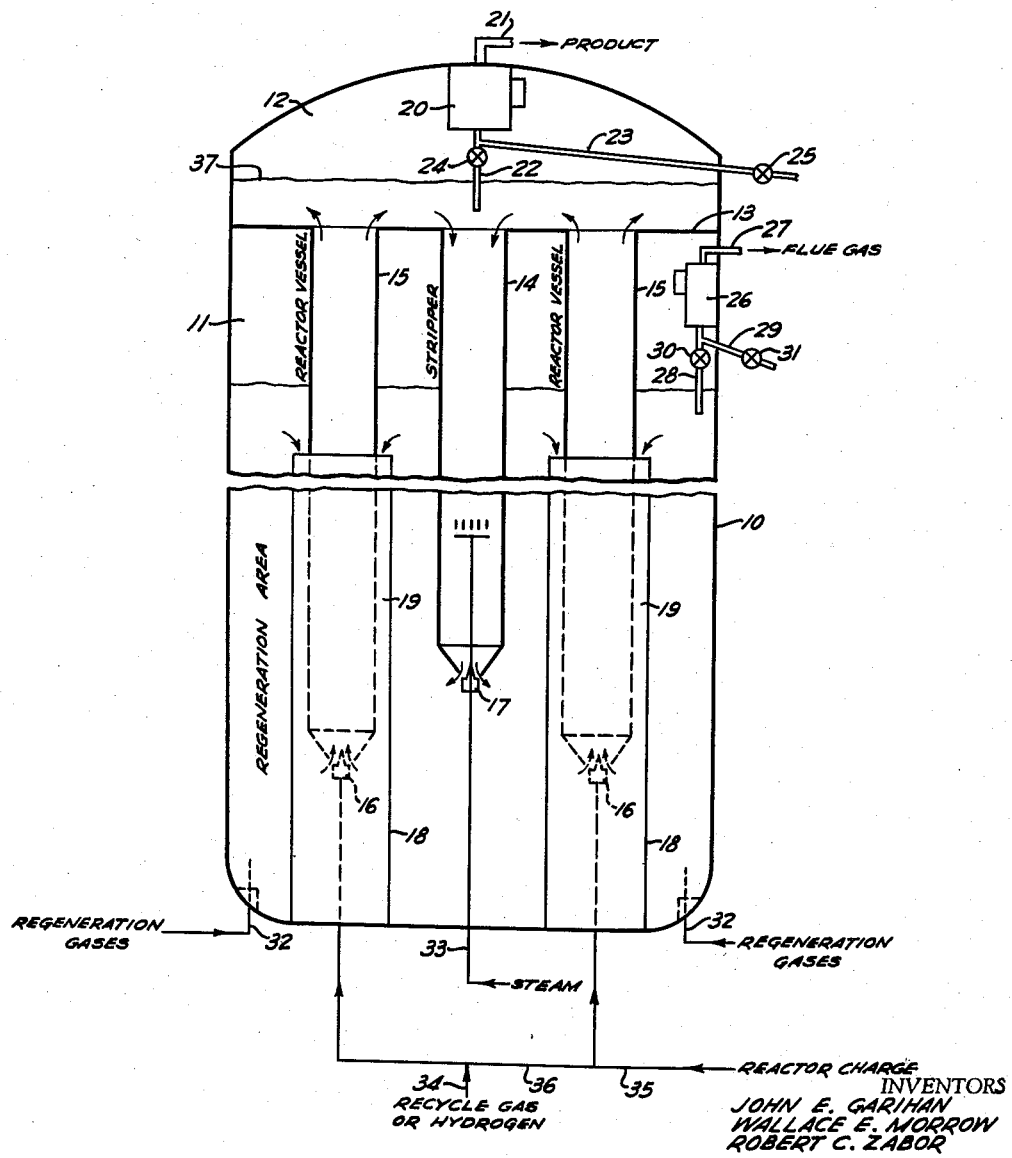

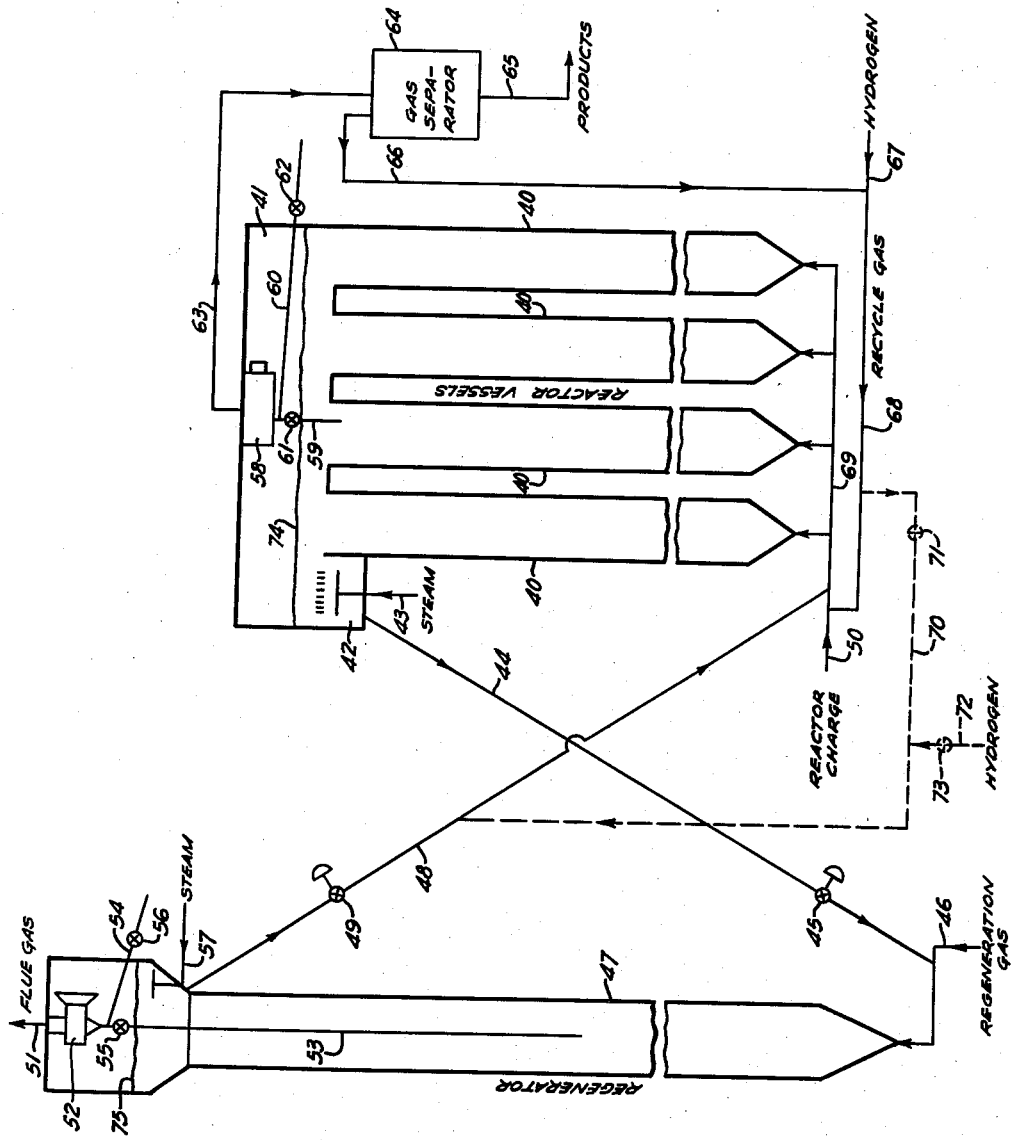

2,967,145
Patented Jan. 3, 1961

---

2,967,145

CATALYTIC REFORMING IN A REACTOR HAVING A HIGH LENGTH-TO-DIAMETER RATIO

John E. Garihan, Tarentum, Pa., Wallace E. Morrow, Kent, Ohio, and Robert C. Zabor, Shaler Township, Allegheny County, Pa., assignors to Gulf Research & Development Company, Pittsburgh, Pa., a corporation of Delaware Filed Oct. 9, 1957, Ser. No. 689,134

5 Claims. (Cl. 208—134)

---

This invention relates to the production of improved hydrocarbon conversion products by carrying out hydroreforming processes in catalytic fluid bed reactors having an increased ratio of reactor length to diameter.

The conversion of hydrocarbons by hydroreforming is commonly carried out in catalytic reactors employing a suitable fluidized catalyst. The fluid catalyst reactors which have heretofore been employed in such processes are designed with length to diameter ratios ranging from about 1 to 10.

It has now been discovered that an improved hydroreforming product may be obtained by the use of fluid catalytic reactors having an increased ratio of length to diameter, expressed as $L/D$. According to this invention, the hydroreforming of a naphtha range hydrocarbon oil is most advantageously performed by passing the oil, under reaction conditions, through a fluid bed reactor having an $L/D$ ratio of at least 25. Preferably the $L/D$ ratios to be employed should be between 25 and 60. As used in this application, the symbols L and D refer to the expanded catalyst bed length and the reactor diameter, respectively, and when the expanded bed length fills the entire reactor the $L/D$ ratio becomes the ratio of actual reactor length to diameter.

In a series of operations illustrating the principle of this invention, straight run naphtha charge was hydroreformed in reactors having differing $L/D$ ratios while otherwise maintaining identical reaction conditions in each reactor. In each reactor the naphtha was hydroreformed to a constant yield of 74.0 percent by volume of $C_5$ or higher hydrocarbons. The hydroreforming product removed from each reactor showed that as the $L/D$ ratio is increased from 10 to 30 the corresponding product Research Clear octane number is increased by about 9 units. The rate of octane number increase fell off at $L/D$ ratios above this range, and a further $L/D$ increase to 56 effected an additional improvement of only about 1 Research Clear octane number. These operations illustrate our discovery that $L/D$ ratios of at least 25 generally, and between 25 and 60 specifically, are unusually favorable for carrying out fluid catalytic hydroreforming processes.

The method and apparatus of this invention are more particularly illustrated in the following description with reference to the accompanying drawings in which:

Figure 1 is a graph showing the relationship between reactor $L/D$ ratio and product octane number in a series of hydroreforming operations employing a Kuwait naphtha charge stock.

Figure 2 shows a reactor design for incorporating the desired $L/D$ ratios of this invention wherein the reactor and regenerator are incorporated as an integral unit.

Figure 3 shows another reactor design for incorporating the desired $L/D$ ratios of this invention wherein the regenerator is separate from the reactor.

The effect of $L/D$ ratio on product octane number is shown graphically in Figure 1. The graph shown in Figure 1 is based upon data obtained by hydroreforming, in units of various $L/D$ ratios, a Kuwait straight-run naphtha stock boiling in the range between 237° and 406° F., having a gravity of 53.0° API, an olefin content of 0.8 percent by volume and an aromatic content of 15.2 percent by volume. In each unit the charge was hydroreformed to a given yield of 74.0 percent by volume of $C_5$ or higher hydrocarbons. Each reactor used in the test employed a 10.8 percent $MoO_3$ on alumina fluidized catalyst, designated as Harshaw 156A-1-4-5, and each unit was operated under similar operating conditions as shown in Table I.

TABLE I

Operating conditions

| | |
|---|---|
| Temperature, °F | 900–1000 |
| Pressure, p.s.i.g | 250 |
| LHSV, vol./hr./vol | 1.0 |
| $H_2$, Naphtha, s.c.f./bbl | 5000 |
| Throughput interval, vol./vol | 1–3 |

The only variable involved in the tests was the dimensions of the reactors used. In all, eight reactor units were employed. Each of the eight points shown graphically in Figure 1 bear a number identifying the particular reactor that it represents and Table II is a tabulation of the physical dimensions of these eight reactors, each of which had essentially the same charging and recovery system.

TABLE II

Reactor dimensions

| Unit No. | Internal Diameter, In. | Expanded Catalyst Bed Length, In. | $L/D$ Ratio | Catalyst Volume, cc. |
|---|---|---|---|---|
| 1 | 1.38 | 17.8 | 13.0 | 300 |
| 2 | 1.05 | 15.1 | 14.4 | 150 |
| 3 | 1.38 | 30.0 | 21.8 | 500 |
| 4 | 2.50 | 27.3 | 10.9 | 1,500 |
| 5 | 2.50 | 37.2 | 14.9 | 2,000 |
| 6 | 2.50 | 45.6 | 18.2 | 2,500 |
| 7 | 1.38 | 30.0 | 21.8 | 500 |
| 8 | 1.38 | 77.5 | 56.4 | 1,500 |

An inspection of Figure 1 shows that an increase in octane number is attained as the $L/D$ ratio of the reactor units are increased. This graph shows that an overall increase of approximately 9 Research Clear octane numbers occurred as the $L/D$ ratio of the reactor was increased from about 10 to 30 while a further increase of $L/D$ ratio from approximately 30 to 60 produced an increase of only about 1 additional Research octane number. In accordance with our invention, an $L/D$ ratio of at least 25 should be employed in hydroreforming reactors.

The theoretical explanation for the increase in octane number attainable by the method of this invention is believed to involve the circulation characteristics of the catalyst in the reactor. If the reactants pass through the reactor in a manner such that there is poor catalyst circulation, this will give rise to stagnant catalyst zones and result in the inefficient employment of the catalyst available in the reactor. Furthermore, poor catalyst circulation will create excessively hot zones in certain regions of the reactor and excessively cold zones in other regions, such as the region adjacent to the walls of the reactor. A seemingly obvious way to improve the circulation characteristics of the catalyst and thereby overcome these difficulties might be to increase the linear velocity of the gases passing through the reactor. At a given throughput, linear velocity varies directly as reactor length for reactors of common diameter. However, data shown in Table II and Figure 1 indicate that even where reactors of common diameter and differing lengths were employed, the reuslts are correlatable to $L/D$, not to linear velocity. One possible explanation for the results being correlatable to $L/D$ may be that there is a natural tendency for the suspended catalyst particles to circulate upwardly in the reactor with the reactant gases and upon reaching the top of the reactor these catalyst particles tend to circulate back down to the lower portion of the reactor along the reactor walls. Such a pattern of movement, which is generally an upward movement in the central portion of the reactor and a downward movement at the walls of the reactor, cannot develop if the height of the reactor or the expanded catalyst bed is small in comparison with the diameter. Therefore, as the ratio of reactor length to diameter increases, this type of overall catalyst flow pattern may tend to develop and produce much more efficient use of all the catalyst in the reactor and also prevent the formation of localized hot and cold regions. Presumably, such a circulation pattern is nearly completely formed at and $L/D$ ratio of about 25 or 30 and therefore an increase of the $L/D$ ratio above this level does little to improve the octane number of the product. It is noted that the invention relates only to fluidized catalyst systems and the theory of this invention is not applicable to systems employing a non-fluidized catalyst. However, it is not intended that this invention be limited to any particular theory or principle.

Each reactor used in the test employed a 10.8 percent $MoO_3$ on alumina catalyst which was subdivided so that 66.5 percent was between 50 and 200 mesh while 16 percent was of a particle size larger than 50 mesh and 17.5 percent was of a particle size smaller than 200 mesh. However, any suitable hydroreforming catalyst could be employed which is in a fluidized state and this invention is not limited to a particular type or particle size of catalyst.

In carrying out the principle of this invention, the design of reactors having a substantially increased $L/D$ ratio necessarily requires a substantial reduction in reactor diameters. However, in order to be commericaly practicable, high $L/D$ reactor systems must maintain the throughput capacity of conventional units without employing excessive heights. Therefore, in order to carry the principle of this invention into operation, it is necessary to employ novel reactor designs.

Figures 2 and 3 illustrate two novel reactor units which are designed for incorporating the desired $L/D$ ratios and maintaining high throughput levels without necessitating reaction systems of excessive height. These designs carry out this objective by employing a plurality of independent, vertical reactor vessels arranged in parallel, each having an $L/D$ ratio between 25 and 60. These parallel, high $L/D$ ratio reactor vessels are arranged coextensive with each other in compact units and have the further advantage of having a common, efficient catalyst regeneration system. These and other advantages in the novel, high $L/D$ reactor units of this invention are more fully explained in the detailed description which follows.

In addition to the requisites of having a high $L/D$ ratio while avoiding excessive reactor vessel heights and still providing a unit of undiminished capacity as compared to conventional low $L/D$ units, the unit shown in Figure 2 has the further feature of efficiently controlling the heat balance involved in naphtha reforming. The reforming of naphtha is an endothermic process requiring the addition of heat to promote the desired reactions. This is usually accomplished by preheating both the naphtha charge and the recycle gas and also by transferring the regenerated catalyst at a temperature higher than the reaction temperature. In addition, with units having separate reactors and regenerators, the reaction vessel must be constructed to minimize heat losses. By employing the construction shown in Figure 2, less heat loss occurs since the reactors are surrounded by a heat source constituting the contaminated catalyst undergoing regeneration. As shown in Figure 2, the regenerator and the reactors are incorporated within an integral unit so that the regenerator zone and the reactor zones are in heat exchange relationship with each other.

Referring to Figure 2, the reforming unit shown comprises an enclosed cylindrical shell 10 which is divided into a large lower chamber 11 and a smaller upper chamber 12 by a horizontal plate 13. A stripper chamber 14 extends vertically downward from a centrally located opening in horizontal plate 13. Although only one stripper chamber is shown, more than one may be employed, and it is not necessary that they be disposed centrally in the reactor. A plurality of high $L/D$ reactor vessels 15 extend vertically downward from other openings in the horizontal plate. The stripper chamber and each reactor vessel extend a portion of the distance from the horizontal plate to the bottom of the cylindrical shell and each reactor vessel terminates with an adjustable valve 16 at its lower extremity while the stripper chamber terminates with an adjustable valve 17. Each reactor vessel 15 has a corresponding vertical standpipe 18 extending vertically upward from the bottom of cylindrical shell 10 a portion of the distance to horizontal plate 13 so that the lower portion of each reactor vessel 15 projects concentrically into the upper open end of each standpipe to form annular spaces 19 between a lower portion of the length of each reactor vessel 15 and an upper portion of the length of each standpipe 18. Upper chamber 12 of the cylindrical shell is equipped with a gas-solids separator 20 which may be a cyclone separator or a micrometallic or ceramic filter which passes solid-free product gases through line 21 and either returns catalyst to the system through dipleg 22 or rejects it from the system through line 23. Lines 22 and 23 are controlled by manipulating valves 24 and 25 respectively. Lower chamber 11 is also equipped with a cyclone separator 26 having an exhaust duct 27, a dipleg 28 and a catalyst reject line 29. Lines 28 and 29 are controlled by manipulating valves 30 and 31 respectively. One or more regenerator gas lines 32 enter lower chamber 11. A line 33 for steam, nitrogen or other inert gas extends to stripper 14. A recycle gas or hydrogen line 34 and a charge line 35 enter header 36 which extends to each reactor vessel 15.

In operating the apparatus shown in Figure 2 in a hydroreforming process, the plurality of vessels 15 serve as parallel reactors having a common catalyst settling section 12, all of which is enclosed within a single closed shell 10. Reactor charge flows through line 35 to header 36 where it is admixed with recycle gas or hydrogen which enters through line 34 and the mixture is then distributed through valves 16 into each reactor vessel 15. Each reactor vessel 15 has an $L/D$ ratio between about 25 and 60. In flowing through valves 16, the charge stream carries with it regenerated catalyst from regeneration area 11. The catalyst to oil ratio in each reactor may be accurately controlled by regulating both the charge rate and the individual valves 16 on the bottom of each reactor vessel. The mixture of charge, recycle gas or hydrogen, and catalyst flows through the reactor vessels into a common catalyst settling area 12 in which a level or interface 37 of catalyst is maintained. The reactor effluent passes through a gas-solids separator 20 where entrained catalyst is recovered and either returned to the unit by means of dipleg 22 or discarded from the unit through line 23 by manipulating valves 24 and 25. The catalyst-free effluent is removed through duct 21 and separated into the desired boiling range fractions in a recovery system, not shown.

The catalyst in settling area 12 overflows into stripper tube 14 where it is stripped of occluded hydrocarbons by means of steam, nitrogen or other inert gas entering through line 33. The stripped catalyst flows through control valve 17 into the regeneration area 11 constituting the space about the reactor vessels 15. Regeneration gas comprised of air or oxygen-enriched gases enters through one or a number of inlets 32 positioned outside the area enclosed by each standpipe 18 and below the lower end of each reactor vessel 15 but preferably at the base of the unit. Regenerator 11 operates under essentially unit temperature and pressure, which generally range from 850° to 1200° F., and 50 to 1000 p.s.i.g. A gas-solids separator such as cyclone 26 recovers catalyst fines from flue gas leaving the regenerator which may be used elsewhere in the refinery. The fines may be returned to the unit through dipleg 28 or discarded from the unit through line 29. Dipleg 28 and line 29 are controlled by valves 30 and 31 respectively. After regeneration, the catalyst flows from regeneration area 11, down the annular spaces 19 formed by standpipes 18 and reactor vessels 15 to the lower region of each standpipe. After reaching the lower region of each standpipe 18, the regenerated catalyst is sucked into the reactor vessels by the gases flowing through reactor inlet valves 16. As shown in Figure 2 there is an open circulatory path for the catalyst in the system whereby catalyst flows into the bottom of the reactor vessels through valves 16, out of the top of the reactor vessels to catalyst settling area 12, down the stripper 14, out of the stripper through valve 17 to regeneration area 11, down annular spaces 19 and back into the bottom of the reactor vessels through valves 16. With valves 16 and 17 open as shown there is an open catalyst path such as is indicated by the arrows shown in Figure 2 and such an open catalyst path coupled with the use of a reactor whose upper end is open to an enlarged catalyst settling area insures continuous catalyst circulation wherein catalyst is continuously charged to and removed from the reactor vessels at substantially the same rate.

Figure 3 shows another apparatus utilizing an $L/D$ ratio between 25 and 60. This apparatus is similar to that shown in Figure 2 in that a common regeneration chamber is employed to regenerate the spent catalyst from a number of reactor vessels. In this case, however, the reactor tubes and the regenerator are not an integral part of the same structure.

The fluid catalytic reactor shown in Figure 3 comprises a plurality of high $L/D$ reactor vessels 40 arranged in parallel and having a common overhead catalyst disengaging chamber 41. Adjacent to the disengaging chamber 41 is a catalyst stripper chamber 42 which is deeper than the disengaging chamber and continuous therewith. Steam line 43 extends into stripper chamber 42. A first catalyst transfer line 44 equipped with flow control valve 45 extends from the bottom of catalyst stripper 42 and joins regenerator gas line 46 before extending into the lower portion of an external regenerator chamber 47. A second catalyst transfer line 48 equipped with flow control valve 49 extends from upper portion of external regenerator chamber 47 and joins reactor feed header 69 which extends into the bottom of reactor vessels 40. The regenerator tube 47 is of sufficient height so that the catalyst may flow by gravity from the bottom of stripper chamber 42 to the bottom of the regenerator through transfer line 44 and also by gravity from the upper portion of the regenerator through transfer line 48 to the bottom of the reactor vessels 40. The exhaust duct 51 of regenerator 47 is equipped with a gas-solids separator 52 having a dipleg 53 and a discharge line 54 which may be used to remove catalyst from the system if desired. Dipleg 53 and discharge line 54 are controlled by manipulating valves 55 and 56 respectively. A steam line 57 extends into the upper portion of regenerator tube 47.

Catalyst disengaging chamber 41 is also equipped with a gas-solids separator 58 which may be a cyclone separator or a micrometallic or ceramic filter having a dipleg 59 and a catalyst reject line 60 which may be used to remove catalyst from the system if desired. Dipleg 59 and line 60 are controlled by manipulating valves 61 and 62. An exhaust duct 63 extends from the top of gas-solids separator 58 to a gas separator 64 from which product is recovered through line 65. A gas recycle line 66 extends from gas separator 64 and joins a fresh hydrogen line 67 to form line 68. Line 68 extends to reactor charge line 50 before extending to the bottom of reactor tubes 40 through a feed header 69. If desired, recycle line 68 may have a by-pass line 70 controlled by valve 71 extending to transfer line 48 at a point downstream from control valve 49. A hydrogen line 72 controlled by valve 73 may extend into by-pass line 70.

When the apparatus shown in Figure 3 is operated as a hydroreforming reactor unit, preheated hydroreforming charge stock enters the system through line 50, mixes with 1000 to 10,000 cu. ft./bbl. charge of recycle hydrogen gases passing through line 66 and contacts the regenerated catalyst entering through transfer line 48. Additional hydrogen to enrich the recycle gas may be added through line 67 since the hydrogen content of the recycle gas should be at least 30 percent. The combined streams pass up through the plurality of reactor vessels 40. Each reactor tube 40 has an $L/D$ ratio between about 25 and 60 and is maintained at a temperature of about 800° F. to 1000° F., a unit pressure of from 50 to 1000 p.s.i.g., and a space velocity of from 0.2 to 4.0 lb./hr./lb. catalyst.

The effluent from the reactor vessels 40 discharges into a common disengaging chamber 41 in which a level or interface 74 of dense catalyst bed is maintained. The product and excess recycle gas pass overhead into gas-solids separator 58 where the entrained catalyst is thrown out and is either returned through dipleg 59 or discarded from the unit through line 60 by manipulating valves 61 and 62. The product and excess recycle gas then pass through line 63 into a gas separator 64 where the recycle gas is separated from the products which are sent through line 65 to fractionation units, not shown.

The catalyst overflows from disengaging chamber 41 into a stripper chamber 42 where any occluded hydrocarbons are removed by steam entering through line 43. Stripper chamber 42 is deeper than the disengaging chamber 41 but is adacent to and continuous with the disengaging chamber. The stripped catalyst flows from the stripper into transfer line 44 and through control valve 45 after which it is carried into regenerator 47 by regeneration gases entering through line 46. The regeneration gases are comprised of air or other oxygen containing gases. Regenerator 47 is operated at a temperature of from 1000° F. to 1150° F. and at essentially unit pressure. A gas-solids separator 52 recovers entrained catalyst, predominantly fines, from the flue gas and either returns it to the unit by means of dipleg 53 or discards it from the unit through line 54 according to the position of valves 55 and 56. Steam may be admitted through a line 57 if it is desired to remove occluded gas from the regenerated catalyst before it is returned to the reactors through transfer line 48 and flow control valve 49. Regenerator 47 is arranged in such a position and is of sufficient length that level 75 of the turbulent bed of regenerator catalyst is well above corresponding level 74 of the reaction unit at all times. By virtue of this arrangement, regenerated catalyst from regenerator 47 is returned by gravity flow to the bottom of reactor vessels 40.

An alternate method of catalyst pickup may be employed in this apparatus which would provide for the prereduction of the regenerated catalyst. This is accomplished by diverting a portion of recycle from line 68 through line 70 to catalyst transfer line 48, entering line 48 at a point down-stream from regenerator control valve 49. If desired, hydrogen entering through line 72 and valve 73 may be used alone or used to enrich the recycle gas for the prereduction of the hydroreforming catalyst.

Both of the novel reactor units described above are designed for upflow operation. However, these units could also be designed for downflow operation. Upflow and downflow refer to the flow of catalyst from the reactor. In upflow operations the catalyst flows from the bottom of the reactor, up through the reactor with the charge stock and is removed from the top of the reaction zone with the liquid products. In downflow units the reaction products are removed from the top of the reactor while the spent catalyst is withdrawn from the bottom of the reactor. This terminology is distinguished from similar terminology used in fixed bed operations which is concerned with the flow of feed stock through the reactor rather than the movement of the catalyst.

While the discussion of this invention has been directed particularly to hydroreforming operations, the principle and apparatus of this invention may be similarly applicable to other conversion operations such as hydrodesulfurization and hydrogenation processes in which a fluid catalytic bed is employed.

The improvement in octane ratings attainable by employing the method of this invention is of particular significance and importance in view of the current high octane demands of high compression engines.

Various changes and modifications may be made without departing from the spirit of this invention and the scope thereof as defined in the following claims.

We claim:

1. A hydroreforming process which comprises continuously charging a naphtha range hydrocarbon fraction, hydrogen and a reforming catalyst to the bottom of a reactor having a length to diameter ratio between approximately 25 and 60, maintaining said catalyst as an expanded fluid bed in said reactor in contact with said hydrocarbon and hydrogen under reforming conditions and continuously removing catalyst and other effluent from the top of said reactor, the rate of removing of catalyst from the reactor being substantially the same as the rate of charging of catalyst to the reactor.

2. A hydroreforming process which comprises continuously charging a naphtha range hydrocarbon fraction, hydrogen and a reforming catalyst to the bottom of a reactor having a length to diameter ratio between approximately 25 and 30, maintaining said catalyst as an expanded fluid bed in said reactor in contact with said hydrocarbon and hydrogen under reforming conditions and continuously removing catalyst and other effluent from the top of said reactor, the rate of removing of catalyst from the reactor being substantially the same as the rate of charging of catalyst to the reactor.

3. A fluid catalytic reactor comprising an enclosed vertically disposed cylindrical shell, a horizontal plate dividing said shell into a large lower chamber and a smaller upper chamber, a stripper chamber extending vertically downward from an opening in said horizontal plate, a plurality of reactor vessels having a length to diameter ratio of approximately 25 to 30 extending vertically downward from other openings in said horizontal plate, said stripper chamber and each of said reactor vessels extending a portion of the distance from said horizontal plate to the bottom of said cylindrical shell and each terminating with an adjustable valve at its lower extremity, a vertical standpipe corresponding to each reactor vessel and extending upwardly from the bottom of said shell a portion of the distance to said horizontal plate so that the lower portion of each reactor vessel projects concentrically into the open upper end of each standpipe to form an annular space between a lower portion of the length of each reactor vessel and an upper portion of the length of each standpipe, gas-solids separating means located in the upper and lower chambers of said shell respectively, conduit means extending into the lower chamber of said shell to a point at the base of said chamber outside the area enclosed by each standpipe for the admission of regeneration gas, and conduit means extending to the lower portion of each of said reactor vessels and to the stripper chamber for the admission of reactants and steam respectively.

4. The reactor of claim 3 wherein the length to diameter ratio of said reactor vessels is between approximately 25 and 60.

5. A fluid catalytic reactor comprising an enclosed vertically disposed cylindrical shell, a horizontal plate dividing said shell to a large lower chamber and a smaller upper chamber, a stripper chamber extending vertically downward from an opening in said horizontal plate, a plurality of elongated reactor vessels extending vertically downward from other openings in said horizontal plate, said stripper chamber and each of said reactor vessels extending a portion of the distance from said horizontal plate to the bottom of said cylindrical shell and each terminating with an adjustable valve at its lower extremity, a vertical standpipe corresponding to each reactor vessel and extending upwardly from the bottom of said shell a portion of the distance to said horizontal plate so that the lower portion of each reactor vessel projects concentrically into the upper end of each standpipe to form an annular space between a lower portion of the length of each reactor vessel and an upper portion of the length of each standpipe, gas-solids separating means located in the upper and lower chambers of each shell respectively, conduit means extending to the lower chamber of said shell at a point outside the area enclosed by each standpipe and below the lower end of each reactor vessel for the admission of regeneration gas and conduit means extending to the lower portion of each of said reactor vessels and said stripper chamber for the admission of reactants and steam respectively.

References Cited in the file of this patent

UNITED STATES PATENTS

| | | |
|---|---|---|
| 2,363,874 | Krebs | Nov. 28, 1944 |
| 2,514,288 | Nicholson | July 4, 1950 |
| 2,643,214 | Hartwig | June 23, 1953 |
| 2,727,810 | Leffer | Dec. 20, 1955 |
| 2,741,581 | Conn | Apr. 10, 1956 |
| 2,758,066 | Brackin | Aug. 7, 1956 |
| 2,787,583 | McGrath | Apr. 2, 1957 |
| 2,799,624 | Slyngstad | July 16, 1957 |